March 9, 1965 J. VON STERNBERG 3,172,926
METHOD AND APPARATUS FOR PRODUCTION OF PRESSURE CASTINGS
Filed May 11, 1961 7 Sheets-Sheet 1

FIG. I

INVENTOR.
JAIME von STERNBERG.
BY
ATTORNEY

INVENTOR.
JAIME VON STERNBERG
BY
ATTORNEY

March 9, 1965  J. VON STERNBERG  3,172,926
METHOD AND APPARATUS FOR PRODUCTION OF PRESSURE CASTINGS
Filed May 11, 1961  7 Sheets-Sheet 3

FIG. 4

INVENTOR.
JAIME VON STERNBERG.
BY
ATTORNEY

United States Patent Office 3,172,926
Patented Mar. 9, 1965

3,172,926
METHOD AND APPARATUS FOR PRODUCTION
OF PRESSURE CASTINGS
Jaime von Sternberg, Hotel Herschen,
Oberuzwiel, Switzerland
Filed May 11, 1961, Ser. No. 109,473
13 Claims. (Cl. 264—88)

The present invention relates to a method and apparatus for the production of pressure castings of metal, plastic such as nylon and bakelite, and other substances which crystalize under pressure, as for example, boron nitride. In this connection, exceptionally high pressures are used in the shaping, for example pressures of up to 3,000,000 atmospheres gauge or more.

In principle, the production of such high pressures, frequently known as ultra-pressures, is known and it has also been known for a long time to treat small articles with such pressures. It has also been proposed to expose larger articles to such pressures and in this connection it was found that the mechanical properties of materials treated with ultra-pressures are favorably affected by such pressure treatment.

Although it is of the greatest value to develop a method and an apparatus by which it is possible, in mass production, to produce castings which are subjected to ultra-pressure during the casting, nevertheless it has not been possible, prior to the present time, to develop such a method and apparatus.

In the previously proposed method of treating individual pieces with ultra-pressure, a purely static apparatus was used, that is, an apparatus without moving parts such as pistons, extrusion press construction or the like. The conversion of such devices, operating with moving parts such as generally known in low-pressure casting processes, into devices in which ultra-pressure can be employed, appeared impossible, since no means were known by which moving parts such as plunger rams could be sealed for such high pressures.

In accordance with the present invention, there is now proposed a process and an apparatus by which it is possible to produce shaped castings with ultra-pressure in mass production. The known difficulties are overcome with the present invention in such manner that a pressure casting machine has been developed that the mold cavity, after being filled with the material which is to be shaped and after the application of a so-called pre-pressure which may amount to about 30,000 atmospheres gauge, is sealed off with the assistance of the pre-pressure produced in the mold cavity, whereupon at a point located between this seal and the mold cavity, there is produced an ultra-pressure which is created by the thermal expansion of a medium heated in a closed autoclave.

The sealing with the aid of the pre-pressure is effected in such a manner that at a point in the casting channel leading into a mold cavity, there is provided a packing which is pressed against a firm surface by the pressure prevailing in the mold cavity. Upon an increase of the pressure in the mold cavity beyond the pre-pressure, the pressure in the packing is also increased and the seal becomes more effective with increasing pressure.

The production of the ultra-pressure is effected by heating a medium present in a closed autoclave, for example, mercury. In principle, instead of mercury, there may be other materials capable of use and which are liquid at the operating pressures, for example Wood's metal, but there are preferred materials in connection with which no liberation of gas takes place.

Since the conventional structural materials for pressure casting machines cannot withstand the ultra-pressures unless of such dimensions likely to make the economy of the process questionable, it is advisable that all parts of the machine which come into contact with the ultra-pressure be first treated with ultra-pressure and thereby considerably improved in strength. Such a treatment can be carried out for example, in the aforementioned previously proposed apparatus. This ultra-pressure treatment is continued until the yield point of the material, for instance of steel, is exceeded.

The apparatus for carrying out the process contains parts which are customary in pressure casting machines namely, a mold consisting of a stationary mold half and a movable mold half, a chamber having a piston for injecting the material to be shaped, as well as means for feeding said material into said chamber. In order to be able to seal the mold cavity off after the application of the pre-pressure, a joint is used which is preferably so arranged that it rests against a stationary wall under the action of the pressure produced in the mold cavity and is so pressed by said pressure against the wall that a complete seal is produced. A suitable embodiment of such a packing consists for example, of a cylindrical piece which has a conical recess and is inserted with this recess facing toward the front into a casting channel which is also cylindrical. This sealing member can also be employed as a piston rod facing the mold cavity, and the end thereof which faces the mold cavity is connected with a piston on which a hydraulic medium can act.

In the construction of the apparatus in accordance with the invention, it is important that the space which is under the ultra-pressure can be closed by means of a resilient closure. This result can, for example, be obtained in such a manner that the piston rod to which the sealing member is fastened, or the front end of which is employed as a sealing member, is not locked during the sealing so that the piston is at all times under the action of a hydraulic medium and therefore can move away in case of unexpectedly high pressures. This embodiment is particularly suitable, since in such case no additional further opening need be provided in the wall of the high pressure space.

The piston rod can also serve as ejector so that, aside from the parting surface of the two mold halves, a single opening in the stationary mold half is sufficient, which is very advantageous in view of the extremely high pressures.

One embodiment by way of example, of the invention is hereafter described in conjunction with the accompanying drawings, in which.

Figure 1:
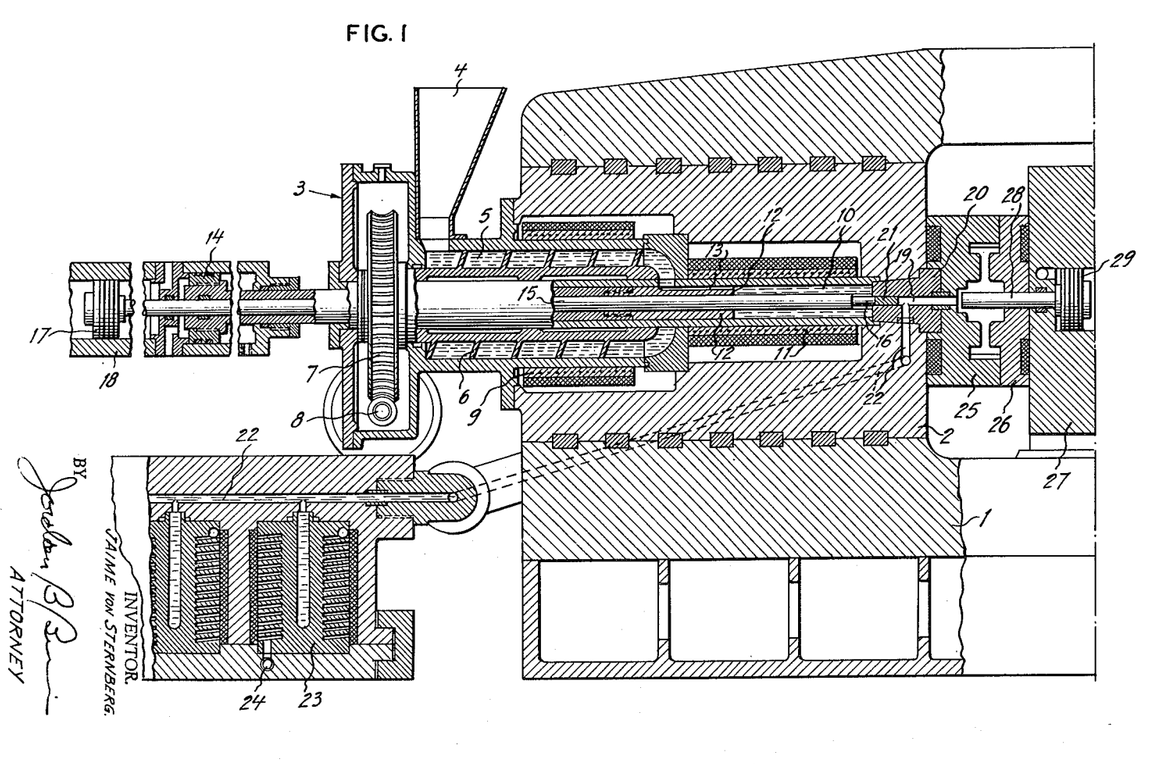
FIG. 1 is a sectional view through a pressure casting machine constructed in accordance with the invention.

FIGS. 1 to 3a shows an embodiment which is intended in particular for the processing of plastics, such as nylon or the like. In FIG. 1 the base frame 1 of the pressure casting machine, there is arranged a block 2 in which the feed device, generally indicated at 3, for the material to be processed is arranged. This material is introduced through a hopper 4 into the chamber 5 and moved forwardly therethrough by a conveyor worm 6, to the mold. This conveyor worm 6 is driven by a reduction gearing 7, 8 from a motor, not shown. Since this embodiment is intended for the processing of plastic, a heating arrangement 9 is provided around the chamber 5. Adjoining this chamber 5 there is a cylinder 10, the temperature within the same being controlled by the encircling heater 11. In the cylinder 10 there is arranged a slidable piston rod 12 which is provided with a recess 13 through which the material can enter even when the piston rod 12 has been moved forward to some extent into the cylinder 10. The piston rod 12 is connected with a piston 14 which is in the form of a double-acting hydraulic piston. The piston rod 12 travels in the axial bore of the worm 5 and within the piston rod 12 there is a slidably arranged piston rod 15. The front end of the piston rod 15 is preferably reduced in diameter, as shown at 16. The piston rod 15 is longitudinally moved by a piston 17 guided in a cylinder 18. Due to the fact that the piston rod 15 is the innermost rod, in case of unexpected high pressure, the piston 17 can move out towards the left, and with a suitable construction of the left end wall of the cylinder 18, this arrangement can be used as a safety valve.

Forwardly of the reduced end 16 of the piston rod 15, there is provided a pouring channel 19 which is in the form of a bore in a block of particularly high strength. This block 20 should consist of a precompacted material, such as a precompacted metal, steel for example. Ordinary structural materials are not able to take up the high pressures which occur. In this pouring channel there is arranged on a threaded extremity 21a of the piston rod 16, a packing 21, the forward end of which is provided with a concave or funnel-shaped recess 22a (FIG. 9) so that the cylindrical outer surfaces of this packing member 21 are pressed so firmly against the wall of the bore 19 as a result of the pressure prevailing in the pouring channel, that a dependable seal is the result. Between the place to which this packing is shifted and the mold cavity, there discharges a channel 22, a portion of which is shown, the rest of the course of the channel being represented by a dot-dash line. This channel 12 leads into a device for producing the ultra-pressure, which device consists of a plurality of individual autoclaves 23 which can be, for example, in the form of cylindrical steel shelves. These autoclaves are provided with means for heating and cooling; in the present case, with the heat exchange conduit 24. Instead of such a heat exchange conduit, other suitable means can be used, such as for example, a known induction heating system. The autoclaves contain the pressure medium, preferably mercury, but other means can also be used, such as metal alloys of low melting point, for example Wood's metal. In principle, it is preferred that those pressure media in connection with which there is no liberation of gas or only a slight liberation of gas be used. These individual parts are connected in parallel and they discharge into the conduit 22. The number of pressure elements to be provided depends upon the desired speed of operation of the pressing process, in which connection, in the case of about ten pressure generators, the required ultra-pressure can be produced within a few seconds, provided of course, that a corresponding pre-pressure has been produced by the piston 12 and that the heating for the ultra-elements is designed for a suitable power.

Figure 2:
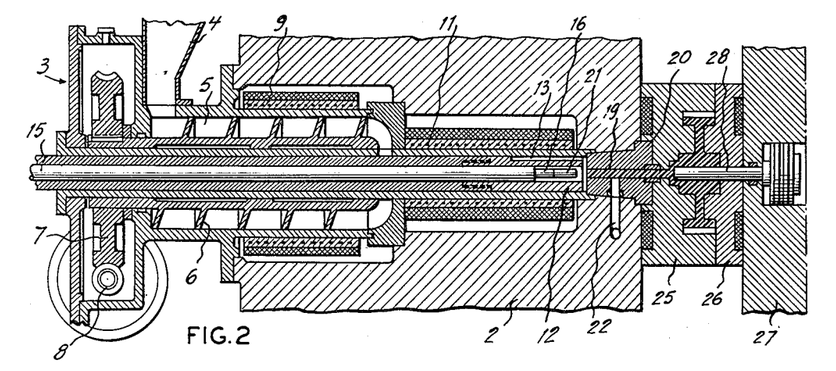
FIG. 2 shows the machine in FIG. 1 in a different phase of the operation, in which the mold cavity is filled with a precisely measured amount of the material, such as plastic, to be shaped.

The pouring channel 19 discharges into the stationary mold half 25 against which the movable mold half 26 can be pressed. This movable mold half 26 is fastened to a mold body 27, the movement of which will be presently described. In this embodiment, a core 28 is provided in the movable mold half 26, which core is actuated by a piston 29. The operating phase shown in FIG. 1 shows the condition before the injection into the mold cavity of the plastic introduced by the worm 6 into the cylindrical chamber 10. FIG. 2 shows the same apparatus, but in FIG. 2 there is shown the operating phase in which the mold cavity has been completely filled with the plastic, in which connection it may be pointed out that due to the construction of the piston 12, a precisely measured and previously adjustable amount of the plastic is delivered in each case through the pouring channel.

Figure 3:
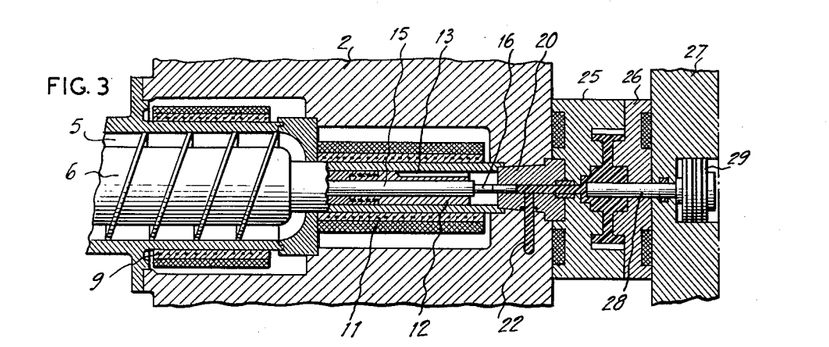
FIG. 3 shows another operating position of the apparatus in which the front end of a piston rod is employed as a sealing member and is introduced into the pouring channel and in this position the ultra-pressure can be applied.
Figure 3A:
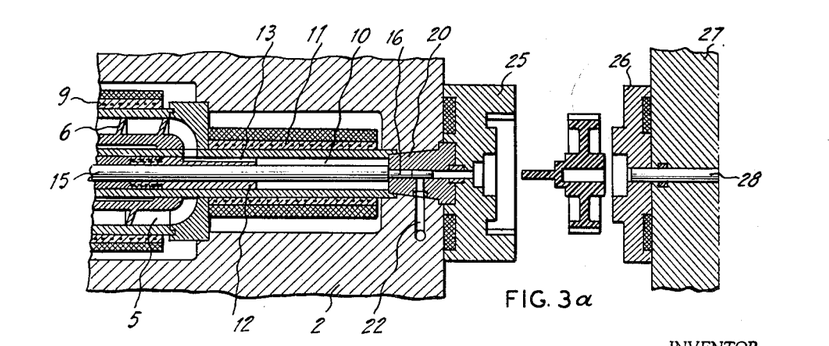
FIG. 3a shows an operation in which the parts are in position of ejection of the molded product after completion of the shaping.
Figure 4:
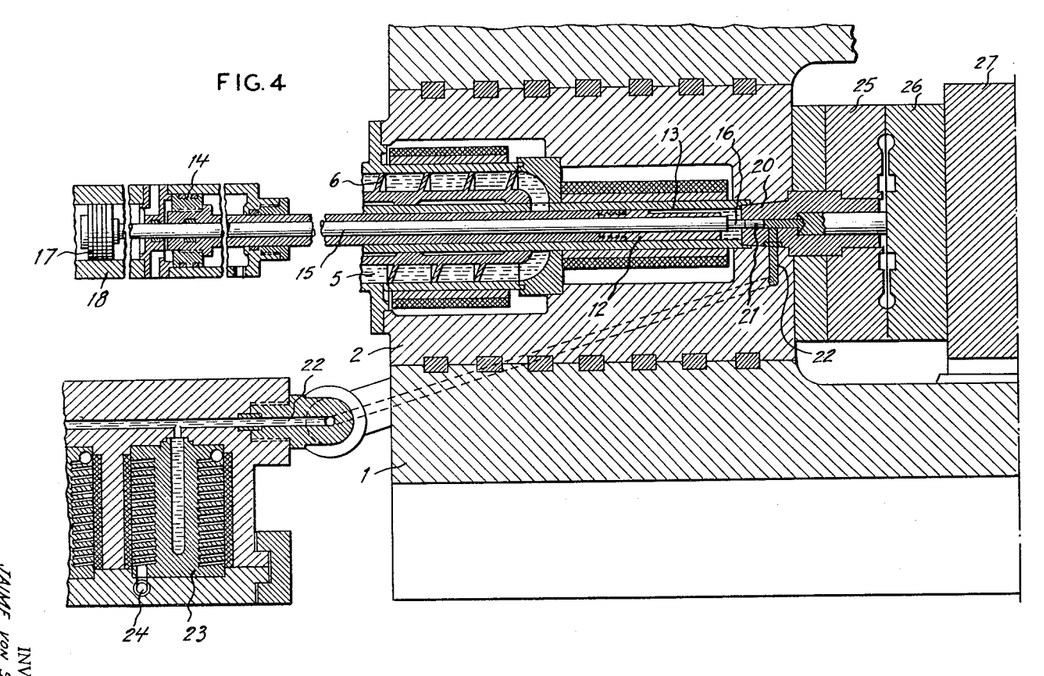
FIG. 4 is a section through another embodiment of a pressure casting machine developed in accordance with the invention, and which is particularly suitable for the casting of metal.
Figures 6, 9:
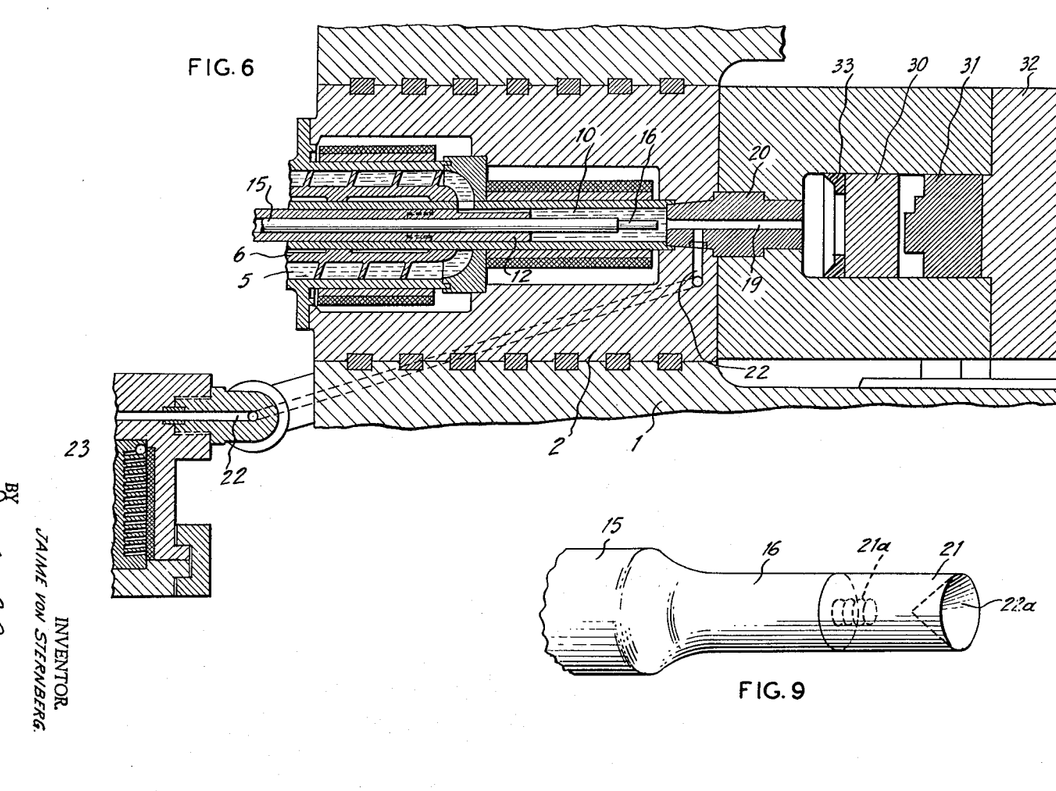
FIG. 6 shows the use of this machine for the production of molds.
FIG. 9 shows how the packing is attached to the end of the piston rod.

FIGS. 3 and 3a show further phases of the operating cycle, the application of the ultra pressure being indicated in FIG. 3, while in FIG. 4 the mold is shown as having been opened and the casting, in the present case, a gear, has been ejected, this being effected by a further advance of the front end 16 of the piston rod 15. The packing 21 on the forward end of the piston rod 15 forms an isolated part which lies in front of the reduced part 16 of the piston rod, and is connected to said part only to such an extent that the packing adheres to the extremity 16 when the piston rod is withdrawn. Due to the wear imposed on the packing 21, occasional replacement of it is necessary, and such replacement is effected through the channel 19 with the mold being opened from the stationary mold half 25. The packing element 21 can, for example, be threadably placed on the extremity 16 as shown in FIG. 9 in which connection it is sufficient for the connection between the extremity 16 and the packing 21 to be so secure that the packing 21 follows the movement of the extremity 16.

The procedure for casting is substantially as follows:

When the molds halves 25, 26 are in their closed relationship, the plastic material in the chamber 5 is introduced by the worm 6 into the interior of the cylinder 10 and from there through the channel 19 into the mold cavity. The mold cavity can be provided with a known closeable vent device not shown.

The plastic material is at first under relatively slight pressure which can be applied by the screw 6. Thereupon the piston 12 is advanced whereby the communication between the chamber 5 and the interior of the cylinder 10 is interrupted and upon the closing off of the cylinder 10 from chamber 5, the pressure in the cylinder 10 and in the mold cavity is increased as much as is permitted by the seal effected between the piston 12 and the wall of the cylinder 10. The advance of the piston 12 is effected by the pressure exerted on the piston 14. When in this step of the process, the limit of the pressure obtainable by these means has been reached, a pressure is then exerted on the piston 17, whereby the piston rod 15 is advanced; the tapered part or extremity 16 and the packing 21 arranged thereon penetrating into the canal 19 only to such an extent that the branch canal 22 just remains open. The pressure on the piston 17 is retained during the next method step, while the ultra-pressure is applied. As the last method step, the ultra-pressure is applied by means of the ultra-pressure generator 22, 24 and the sealing with respect to the cylinder 10 is taken over primarily by the packing 21, which deforms under the influence of the ultra-pressure, this packing pressing so strongly against the wall of the canal 19 that there is exerted on the extremity 16 of the piston 15 only a moderate pressure which can be absorbed by the piston 17. If the pressure that is exerted by the packing 21 on the extremity 16 should for any reason become too great, the piston 17 can yield towards the left so that this arrangement constitutes a safety valve.

Figure 5:
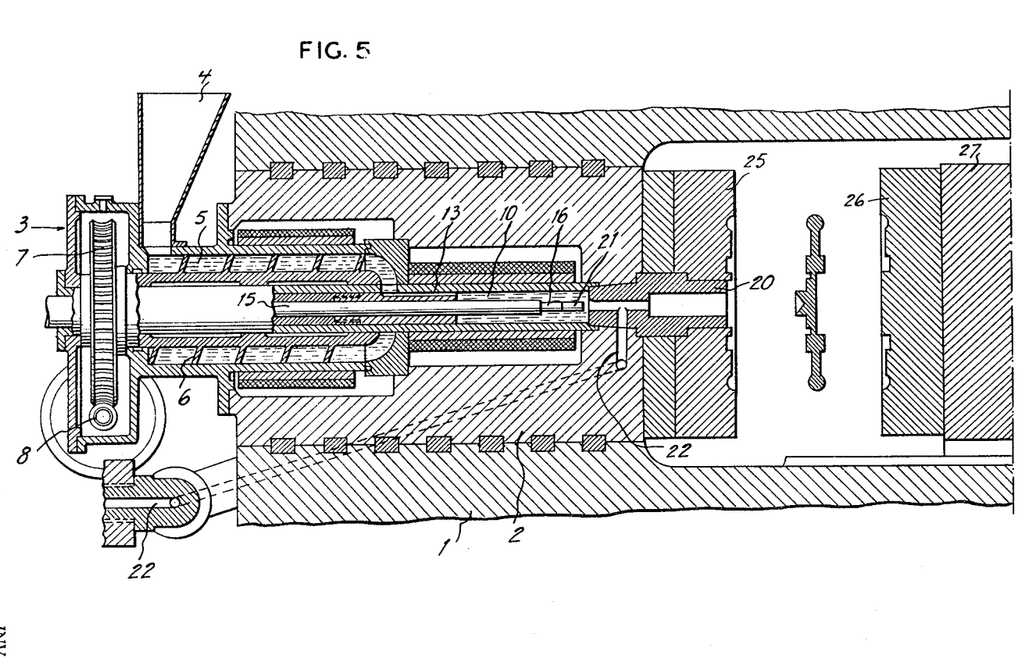
FIG. 5 shows this machine with the mold open.

FIG. 4 shows an embodiment of the apparatus such as used in particular for the casting of metal parts. This embodiment differs from the embodiment shown in FIGS. 1 to 3a in that the worm chamber and the cylindrical chamber 10 are not heated. The rest of this embodiment is practically the same except that the pouring channel has a larger diameter in the direction toward the mold cavity, so that it can receive the material to be shaped. The pressure in the mold cavity is then applied in such a manner that a packing provided in the widened part of the pouring channel is pushed by a pressure medium present in the cylindrical chamber 10 (towards the right in FIG. 4) whereby the molding material is forced into the mold cavity. FIG. 5 shows the same embodiment with the mold open and the casting ejected.

In FIG. 6 there is shown schematically how a mold half can be produced in the apparatus in accordance with the invention. The material to be shaped is introduced in the form of a block 30 into the mold cavity, and a die 31, which is also arranged in the mold cavity, rests against the mold support 32, which corresponds to the mold support 27 of the first-described embodiment. In the structure of this embodiment, there is also provided a plastic ring 33 for the sealing of the pressure, thereby preventing the entrance of the pressure liquid into the space between the block 30 to be shaped and the die 31. The molds produced in this manner can be used not only in connection with the present apparatus, but since they have been shaped above the yield point of the material, for example of the steel, they have exceptionally great strength and can be used for an extremely large number of shaping processes.

Figure 7:
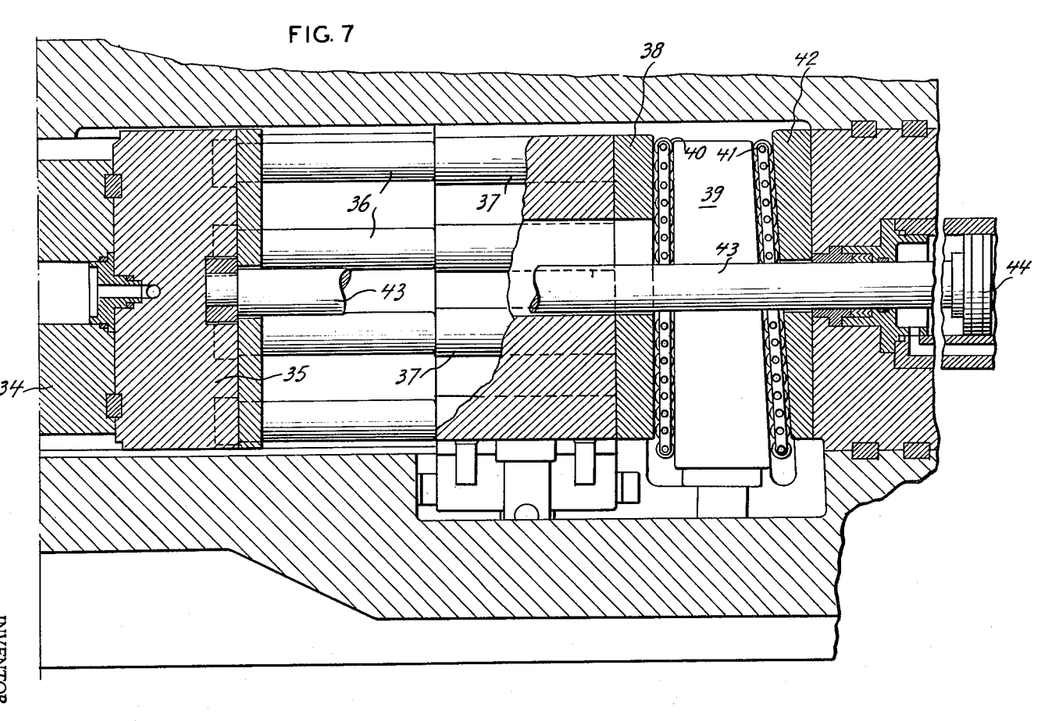
FIG. 7 shows the locking mechanism for the movable mold half.
Figure 8:
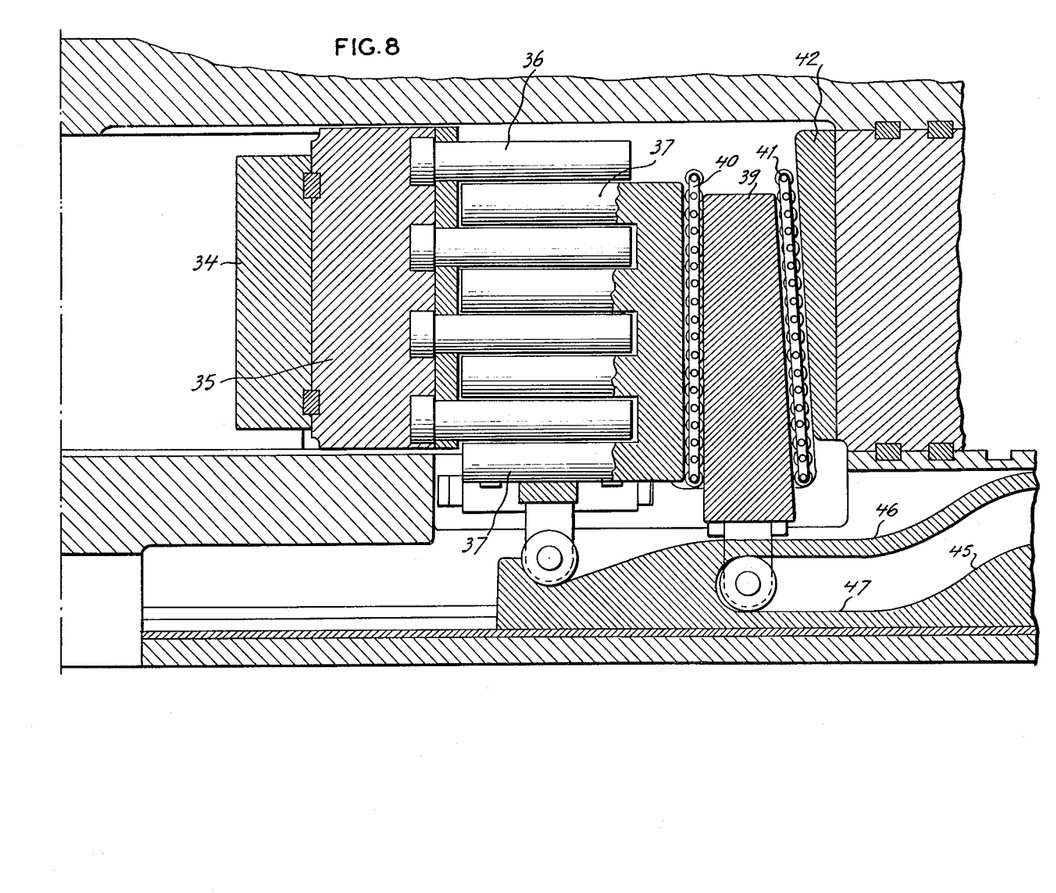
FIG. 8 shows an arrangement for moving the closure block and locking part.

FIGS. 7 and 8 show the movement and guiding of the movable mold half, and for clarity in illustration the representation of only the mold support 34 has been shown. This mold support is anchored to a closure ring 35 in which a number of closure bolts 36 are inserted. These closure bolts consist of solid steel elements which are subjected to a pre-treatment with ultra-pressure. Upon the opening of the mold, bolts 37 which are fastened to a closure block 38 (FIG. 7) and are designed in approximately the same manner as the closure bolts 36, are pushed between the latter bolts. Upon the closing of the mold, the movable mold half moves in closing direction (towards the left in FIG. 7) and the closure block 38, together with its bolts 37, is raised by an amount equal to the diameter of one bolt, so that the end surfaces of the bolts 37 and 36 lie against each other. In this way, a locking can be created which can take up extremely high forces. The closure block 38 can be made of several parts to be thereby of the required strength.

For the holding of the closure block when the mold is closed, there is provided a closure wedge 39 having sets of rollers 40 and 41 respectively located at its front and rear sides. These rollers may consist of cylinders supported by needle or roller bearings on pins which are anchored on bands. The material of the rollers must be such as to absorb extremely high pressures and these rollers are therefore preferably made of steel which has been pre-treated with ultra-pressure. The wedge angle of the wedge 39 can be adapted to the specific pressures provided. The abutment 42 shown in the drawing, toward the right in FIG. 7, is rigidly connected to the foundation or base of the apparatus. The wedging and locking device shown in FIG. 7 is so designed that at a central point there is space for a push rod 43 connected at one end with the mold support and at the other end with a piston 44 by which the drive force required for displacing the movable mold half and its support, as well as the holder connected therewith is supplied.

The moving mechanism for the closure block and the closure wedge can best be noted from FIG. 8, the same showing the position of the closure block when the mold is open while in FIG. 7, the position is indicated when the mold is closed.

The manner of operation of the locking device of FIG. 7 is substantially as follows:

The movable mold half 26 or the block 31 which corresponds to it in its action, are fastened to a block 27 shown in FIG. 1, or to the block 32 shown in FIG. 6. These parts 27 and 32 correspond to the part 34 of FIGS. 7 and 8. Part 34 can be identical with part 32 or with part 27 depending on the uses of the apparatus. The part 34 is moved, together with the block 35, and the closure bolt 36 by a push rod 43, driven by the piston 44. When this unit 34, 36 has been displaced to the left, the second set of closure bolts 37 is raised, together with the plate 38 and when these elements 37, 38 have been raised to such an extent that the end surfaces of the closure bolts 36 and 37 are opposite each other and thus when the mold is closed, the wedge 39 is raised, as a result of which the two mold halves are firmly pressed against each other.

For the opening of the mold, the wedge 39 is lowered so that the tension is taken up by the closure block 38 and thereupon said closure block is lowered to such an extent that the closure bolts 37 are brought into alignment with the spaces between the closure bolts 36, so that the movable mold half can be withdrawn by means of the piston rod 43 at which time the two sets of closure bolts slide within one another. By replacing one set of the closure bolts, a different position of the mold support of the movable mold can be obtained, so that it is relatively easy to convert the device to accept a different mold.

The movement of the closure block 38 and of the wedge 39 is effected by means of a cam member 45, which has cam tracks 47 and 46. These cam tracks are so related to each other that the wedge 39 is in its lowered position when the closure block is raised or lowered while the closure block remains in its raised position while the wedge 39 is brought upward.

When the apparatus constructed according to the invention is to be used for pressure castings under ultra-pressure, some time of preparation is necessary, since the materials used are not capable of taking up the high pressures and stresses. Therefore, before placing the apparatus in molding operation, the pressure is applied step by step, for example at the start in steps of 500 atmospheres guage, and later on in steps of 1000 atmospheres gauge. In this connection, the cavities which come into contact with the high pressure expand and the material is deformed beyond its yield point and there is imparted to the material an extremely high mechanical strength. The layer which forms around the pressure spaces then takes up the essential part of the pressure stress and the outer material, for example, the marginal layers of the pressure line 22 are then only subjected to very slight stress.

Having thus described several embodiments of the invention, it is obvious that the same is not to be restricted thereto, but is broad enough to cover all structures coming within the scope of the annexed claims.

What I claim is:

1. An apparatus for producing pressure castings comprising, a mold cavity, a passage leading thereto and through which molding material is forced to enter the mold cavity, a cylindrical chamber through which the material is forced to enter the passage, a conduit for conveying an ultra-pressure fluid to an intermediate portion of said passage, a piston rod movable through the chamber and entrant into the passage short of said portion, and an expansible packing carried by the free end of the piston rod and entrant into the passage short of said portion and capable of expansion therein under the imposition of the ultra-pressure by contact with said fluid pressure, to act as a seal in said passage.

2. An apparatus for producing pressure castings as provided for in claim 1, wherein the packing is a cylindrical element detachably mounted on the forward end of the piston rod and is provided in its front end with a conical recess.

3. An apparatus for producing pressure castings comprising, a hopper for the material to be molded, a chamber into which said material is received from the hopper, a spiral feeder operative within the chamber, a cylinder into which the material is fed in predetermined quantities from the chamber, a piston axially movable through the spiral feeder and operative to force material from the chamber into the cylinder, a mold cavity, a feed passage communicating at one end with the mold cavity and having its other end in communication with the interior of the cylinder, the piston being effective to force material from the interior of the cylinder through said passage and into the mold cavity, a piston rod axially movable through the piston, said piston rod having an extremity entrant into the feed passage, said extremity carrying a deformable sealing element, and means for supplying an ultra-pressure fluid into the feed passage to thereby cause an application of such ultra-pressure fluid on the material.

4. An apparatus for producing pressure castings as provided for in claim 3, wherein the means which supplies the ultra-pressure fluid includes a conduit extending from a source of the fluid and which communicates with the feed passage at a point between the cylinder and the mold cavity.

5. An apparatus for producing pressure castings comprising, a mold cavity, a feed passage leading thereto and through which the molding material is forced to enter the mold cavity, a piston for moving the material toward the cavity, a cylinder through which the material is forced to cause it to enter the feed passage, a conduit for conveying an ultra-pressure fluid to said passage at a point between the mold cavity and the cylinder, a piston rod movable through the cylinder and axially movable through the piston and entrant into the passage, and an expansible and detachable packing carried by the piston rod and entrant into the passage by movement of the piston rod and capable of deformation therein under the imposition of the ultra-pressure by contact with said fluid, and thereby caused to act as a seal in said passage.

6. An apparatus for producing pressure castings as provided for in claim 5, wherein the packing is a cylindrical element threadably mounted on the forward end of the piston rod, the piston rod being reduced in diameter at said end and the packing being provided in its front end with a conical recess.

7. An apparatus for producing pressure castings comprising, a hopper for the material to be molded, a chamber into which the material is received from the hopper, a spiral feeder operative within the chamber for feeding material out of the chamber, a cylinder constituting an extension of the chamber and into which the material is fed in predetermined quantities from the chamber, a piston axially movable through the spiral feeder and through the cylinder and operative to cause delivery of material from the chamber into the cylinder, a mold cavity, a feed passage communicating at one end with the mold cavity and having its other end in communication with the interior of the cylinder, the piston being effective to force material from the interior of the cylinder through said passage and into the mold cavity, a piston rod axially movable through the piston and through the spiral feeder, said piston rod having an extremity of reduced diameter entrant into the feed passage, said extremity carrying at its forward end a deformable sealing element, said element having a recessed front end, and means for supplying an ultra-pressure fluid into the feed passage to cause an application of such ultra-pressure on the material.

8. An apparatus for producing pressure castings as provided for in claim 7, wherein the chamber and the cylinder are encircled by heating means, the mold cavity being composed of a movable mold half and a stationary mold half, and wedging means effective to hold the movable mold half against the stationary half in preparation for and during the molding operation.

9. In an apparatus for producing pressure castings, a mold cavity, a passage leading thereto from a source of material to be molded, a conduit leading into an intermediate portion of the passage from a source of ultra-pressure fluid, a stem axially entrant into the passage short of said portion, and a plug of deformable sealing material carried by the free end of the stem into the passage short of said portion and maintained therein during the application of the ultra-pressure on the material in the mold cavity and in the passage to seal off said stem from said ultra-pressure fluid and to permit said pressure to be transmitted to said cavity.

10. In an apparatus for producing pressure castings, a mold cavity, a chamber containing material to be molded, feed means in the chamber, a piston having valve means for controlling the feed of the material from the chamber toward the mold cavity, a passage between the piston and the mold cavity and through which the material passes to reach the mold cavity, a conduit for conveying ultra-pressure fluid into an intermediate portion of the passage, and a packing carried by the free end of the stem and short of said portion and deformable to act as a seal in the passage when the ultra pressure is applied therein to permit said pressure to be transmitted to said cavity.

11. The method of making pressure castings comprising forcing molding material into a mold cavity under relatively light pressure; closing off communication between the source of supply of the material and the mold cavity and increasing the pressure on the molding material, closing off communication between the mold cavity and the light pressure-applying means and then applying ultra-pressure to the material in the mold cavity from a fluid pressure source to seal off said closed communication and to compact said molding material.

12. The method of making pressure castings comprising, forcing molding material into a mold cavity by relatively light pressure of a piston, closing off communication between the mold cavity and the source of the material and increasing the piston pressure on the material, closing off communication between the piston and the mold cavity and then applying ultra-pressure by a fluid on the material then in the mold cavity from a fluid pressure source to seal off said closed communication and to compact said molding material.

13. Method of producing pressure castings, consisting of injecting the material to be cast into a mold cavity by a piston with a pressure of up to about 500,000 p.s.i. (35,000 atmospheres gage), in which the piston surface which projects forwards in the shape of a hollow cone is sealed by the pressure acting on it against the cylinder walls, and the subsequent injecting of a liquid into the space between the piston and the entrance opening into the mold with a pressure of more than about $1.2 \times 10^6$ p.s.i. (90,000 atmospheres gage) and preferably $4.3 \times 10^6$ p.s.i. (300,000 atmospheres gage) the pressure being produced by the expansion of the liquid upon its heating in a closed system.

References Cited in the file of this patent

UNITED STATES PATENTS

| | | |
|---|---|---|
| 2,033,735 | Pack | Mar. 10, 1936 |
| 2,418,856 | Stacy | Apr. 15, 1947 |
| 2,680,880 | Corbett | June 15, 1954 |
| 2,706,308 | Lorenz | Apr. 19, 1955 |
| 3,020,591 | Breher et al. | Feb. 13, 1962 |